Patented Apr. 30, 1935

1,999,210

UNITED STATES PATENT OFFICE 1,999,210

HYDROUS SILICATE GELS AND METHOD OF MAKING THE SAME

Ernest Wayne Rembert, Plainfield, N. J., assignor to Johns-Manville Corporation, New York, N. Y., a corporation of New York No Drawing. Application April 10, 1931, Serial No. 529,281. Renewed July 26, 1934

23 Claims. (Cl. 252—2)

This invention relates to a method of making hydrous silicates and particularly relates to a method of producing such hydrous silicates by means of a reaction between insoluble or sparingly soluble metallic bases or salts and a soluble silicate in aqueous slurry. The ingredients preferably employed in carrying out the method of this invention are substantially insoluble or sparingly soluble bases or salts of alkaline earth metals and soluble silicates such as sodium or potassium silicate, these ingredients being caused to react in an aqueous suspension or slurry.

The sparingly soluble bases or salts should preferably be somewhat more soluble than the silicates which are to be formed. Fairly soluble salts or compounds of amphoteric metals and/or alkaline earth metals may also be used in producing products of great utility, provided the process is carefully carried out as described hereinafter.

In addition, a soluble base or alkali adapted to prevent appreciable hydrolysis of the soluble silicate also may be used to advantage in certain instances.

The products of this invention are hydrous silicates. The only gel having adsorptive properties which has been developed heretofore is the well known silica gel but the hydrous silicates of this invention although partaking of the nature of gels differ very appreciably from silica gel. Furthermore, it has been found that the presence of silica gel in the product is detrimental. The hydrous silicates produced in accordance with the method of this invention have much greater adsorptive properties for most purposes and in particular for decolorizing mineral oils and the like, than silica gel and a much wider variation in properties of the silicates possible due to the variety of bases or salts which may be employed in the reaction.

Furthermore, it has also been discovered that the reaction between insoluble or sparingly soluble basic compounds and sodium silicate or potassium silicate in an aqueous slurry or suspension, should be carried out under particular conditions of time, proportions and alkali concentration so as to produce hydrous silicates having the most effective adsorption characteristics.

It has also been discovered that the hydrous silicates made as described hereinbefore must contain certain optimum percentages of combined water in order to obtain maximum decolorizing efficiency.

It is an object of this invention to disclose and provide an improved method of producing hydrous silicate products of alkaline earth metals.

Another object of the invention is to disclose and provide an improved method whereby adsorbents may be produced from sparingly soluble basic compounds.

Another object is to disclose and provide an improved method of producing hydrous magnesium silicates having superior adsorptive properties.

A further object of this invention is to disclose and provide an improved method of producing hydrous silicates in finely divided form from basic metallic compounds and soluble silicates.

A still further object of this invention is to provide an improved method of making hydrous silicates having adsorptive properties from water soluble silicates, such hydrous silicate products being substantially free from silica gel.

A still further object of this invention is to provide an improved method utilizing certain definite molal ratios, temperatures, pressures, concentrations, times, and other conditions whereby the most effective forms of hydrated silicates of alkaline earth metals may be produced in finely divided form from salts and compounds of alkaline earth metals and water soluble silicates.

These and other objects, uses and advantages of this invention will become apparent to those skilled in the art from the following detailed description of the invention.

In general, the method of this invention may be carried out by forming a slurry, suspension or solution in water by disseminating therein a sparingly soluble or soluble basic compound or salt of an alkaline earth metal and then slowly adding thereto a water soluble silicate such as sodium silicate in aqueous solution, preferably with accompanying agitation. The slurry, suspension or solution may be heated in order to facilitate the reaction. A sufficient quantity of a soluble base or alkali is preferably added to the slurry so as to prevent appreciable hydrolysis of the soluble silicate and thus obviate the formation of silica gel. The characteristics of the resulting silicate may be varied by varying the character of sparingly soluble or soluble basic material or salt used and also by varying the rate at which the soluble silicate is added to such slurry, by altering the proportions of the reacting material present in the reaction mixtures, and by the control of other reacting conditions such as temperatures.

It has been found that if the water soluble silicate is added en masse or rapidly to the suspension or solution of sparingly soluble basic material or soluble salt in water, a hydrous silicate is formed but such product is dense, granular, and of very low efficiency as far as its adsorptive quality is concerned. Similarly, an inefficient product is generally produced by adding the suspension or solution of a compound or salt of an alkaline earth metal to the soluble silicate solution. It has been ascertained that these undesirable results are due to the presence during a given portion of the reaction period of an excessive amount of the soluble silicate. If, however, the soluble silicate is slowly added to the suspension or solution of metallic compound or salt in water, an active adsorbent of much lower density and of much better structure is obtained. In general it has been found highly desirable to have the addition of soluble silicate in aqueous solution to a suspension of the sparingly soluble base or salt in water cover a period of at least one hour, very good results being obtained when the period of addition consumes three to five hours. The time of reaction, therefore, is of great importance and should be kept clearly in mind. The addition of the soluble silicate is made continuously, or in successive increments over this period, the quantity added at any given time being varied according to the particular reactants and reacting conditions employed. In general it has been found that very satisfactory results are obtained by adding the required quantity of soluble silicate at a uniform rate over the reaction period.

Any soluble salt or compound of an alkaline earth metal may be used although the sparingly soluble basic compounds of such metals appear to produce better adsorptive agents. The oxides of magnesium, magnesium hydroxide (natural or precipitated), magnesium carbonate or basic magnesium carbonate and magnesium sulphate, may be used. Particularly effective hydrous silicates have been obtained by the use of magnesium compounds particularly precipitated magnesium compounds characterized by their lightness or low bulk density such as, for example, magnesium oxide, carbonate or hydroxide, or, preferably a precipitated magnesium carbonate. When magnesium compounds are employed the molal ratio between MgO and $SiO_2$ should preferably be in the range of 0.3–1.0 although higher or lower ratios may be used if a product of different characteristics and for other uses is desired. For normal purposes, a molal ratio of 0.5 produces very good results.

The soluble silicate employed in the reaction may either be a commercial grade of sodium silicate or potassium silicate in concentrated aqueous solution or diluted. A sodium silicate containing 1 mole of $Na_2O$ to 3.34 mols of $SiO_2$ has been found to give very satisfactory results.

The reaction between the finely divided sparingly soluble basic material in aqueous suspension and a soluble silicate may be carried out at ordinary room temperatures but the rate of reaction is accelerated by carrying on the reaction at an elevated temperature, for example, a temperature of say 150° F. to 200° F. Furthermore, the reaction may even be carried out under superatmospheric pressure and a higher temperature. The aqueous suspension employed should be sufficiently fluid so as to permit ready agitation and pumping or discharge of the contents of the digestion or reaction kettle upon the completion of the reaction.

It has been found desirable to introduce into the slurry a small proportion of a soluble alkali such as, for example, sodium carbonate, sodium hydroxide, or the like, for the purpose of preventing appreciable hydrolysis of the soluble silicate and the formation of silica gel. The initial concentration of the soluble alkali or base in the aqueous suspension or slurry may vary from about 0.02N to about 1.N depending somewhat upon the character of the soluble silicate employed.

In the preparation of certain hydrous silicates, it has been desirable to introduce a porous carrier material such as finely divided pumice or diatomaceous earth. Such finely divided pumice or diatomaceous earth may be added to the basic material in aqueous suspension or it may be mixed with the water soluble silicate before its addition to the slurry.

As has been stated hereinbefore, it is important, in order to develop hydrous silicate gels of optimum adsorptive properties, to add the soluble silicate to the slurry, suspension or solution slowly with continuous agitation. If, for example, a sodium silicate solution is added to a slurry containing precipitated magnesium carbonate, the two being proportioned so as to give a molal ratio of MgO to $SiO_2$ of 0.5, rapid addition will produce a hard, granular hydrous silicate containing appreciable quantities of silica gel which exhibits a low adsorption efficiency when an attempt is made to use such silicate for decolorizing mineral oils. If, on the other hand, the silicate is added to the slurry of magnesium carbonate in an aqueous solution containing some sodium carbonate, over a period of about four hours, with agitation, a very active hydrous silicate is obtained which is less dense and possesses an adsorption efficiency higher than any of the materials available for petroleum decolorization at the present time. In this specific example, as a result of chemical reaction, a sodium base or salt is formed (sodium carbonate) which can be recovered by evaporation of the solution after the hydrous magnesium silicate is separated from the solution by filtration, centrifuging, or the like.

The slow or gradual addition of soluble silicate to the suspension is desired so as to form the desired structure in the product. The time consumed in making such addition may vary with the solubility of the compound of alkaline earth metal suspended or dissolved in the reacting medium and the concentration of the soluble silicate which is added.

After the reaction has been completed, the suspension of hydrous silicate is filtered, settled, thickened, or otherwise treated so as to separate the reaction products or hydrous silicates in finely divided form, from the aqueous medium of the suspension.

As has been stated before, the filtrate containing the soluble alkali may be recovered and a portion thereof reused in the treatment of additional batches of material. The hydrous silicates resulting from the reaction may be washed with water in any suitable manner as, for example, by being reslurried and refiltered. It has been found that by treating the hydrous silicate reaction products with a dilute acid solution preferably by slurrying the product with an acid solution of a concentration just sufficient to neutralize the free alkali, the adsorption efficiency of the products is enhanced.

Care should be taken in drying the hydrous silicate products of this invention. It has been found that it is desirable to retain in the material at least 5% of combined water in order to produce adsorbents of optimum efficiency. The product may be dried to a water content of about 20% without substantially impairing its effectiveness as an adsorbent. In drying, therefore, substantially only the free water should be removed in most instances.

The effectiveness of products made in accordance with this invention will be apparent from the following results of decolorization tests made on a petroleum oil derived from Pennsylvania crude having a gravity of 25.6° A. P. I., a viscosity of 152 seconds at 210° F. and a color of 140 (½ inch dilute Lovibond) or dark as determined by the A. S. T. M. method. A product made from a chemically pure precipitated magnesium carbonate using a magnesia-silica ratio of 0.466 to 1, the reaction being conducted at 80° F. for six hours, and the addition of the requisite quantity of sodium silicate being made continuously at a uniform rate over this period, produced a final color of 4½ (A. S. T. M.) on the oil described hereinbefore. A product produced from the same materials, in the same proportion, was prepared by mixing the entire quantities of the reactants and then boiling them for a period of one hour to insure complete reaction. The product thus made decolorized the oil under the same test condition to give a final color of 7½ indicating an efficiency of less than 35% compared with the product made in accordance with this invention.

The specific advantages to be derived from the addition of a soluble base or alkali to prevent hydrolysis of the soluble silicate is indicated by the following results. A product made from a chemically pure precipitated magnesium carbonate using a magnesia-silica ratio of .7, the reaction being conducted at 110° F. for 5 hours and the addition of the requisite quantity of sodium silicate being made continuously at a uniform rate over this period produced a product which when tested as described above gave a final color of 5¾. A product produced under similar conditions except that a .27N sodium carbonate was employed as make up liquor for the reaction mixture when tested in the same manner gave a final color of 4¾.

In all of the above examples, the product was dried to a point above that at which combined water is driven off. The reaction mixture in each instance had a consistency of about .6 gallon of water to one pound of solids.

Products made in accordance with this invention may be employed for the decolorization of numerous liquids such as animal oils, vegetable oils, and mineral oils. Furthermore, they may be employed as selective adsorbents for the treatment of gas mixtures. It has been found that when decolorization of petroleum oils is effected by these products much less oil is lost by adsorption than when adsorbents such as fuller's earth are employed. Furthermore, it has been found that the bleach obtained by the use of hydrous silicates made in accordance with this invention is stable and the color does not revert upon standing.

It will be apparent to those skilled in the art that numerous changes and modifications can be made and as a result of such changes and modifications, give rise to silicate products of different physical properties. In this manner, the physical characteristics of the products can be varied, depending upon the use to which they are to be put. The changes may comprise variation in the type or character of the compound or salt of alkaline earth metal used as one of the raw ingredients, variation in the rate at which the soluble silicate is added to the suspension or solution, variation in the effective soluble silicate concentration in the reactive medium during reaction, and variation in the degree or extent of drying or acid treatment of the product.

All such changes and modifications as come within the scope of the appended claims, are embraced thereby.

What I claim is:

1. In a process of producing insoluble silicates in finely divided form, the steps of disseminating a compound of alkaline earth metal in an alkaline aqueous medium, and slowly adding a soluble silicate to such medium to form a silicate of such metal, the rate of addition of the soluble silicate being such as to maintain its concentration below that concentration at which an insoluble silicate having a dense granular structure and low adsorption efficiency is formed.

2. In a process of producing insoluble silicates in finely divided form, the steps of disseminating a compound of alkaline earth metal in an alkaline aqueous medium, slowly adding a soluble silicate to such medium to form a silicate of such metal, the rate of addition of the soluble silicate being such as to maintain its concentration below that concentration at which an insoluble silicate having a dense granular structure and low adsorption efficiency is formed, and separating the solid reaction products from the aqueous medium.

3. In a process of producing insoluble silicates in finely divided form, the steps of disseminating a compound of alkaline earth metal in an alkaline aqueous medium, slowly adding a soluble silicate to such medium to form a silicate of such metal, the rate of addition of the soluble silicate being such as to maintain its concentration below that concentration at which an insoluble silicate having a dense granular structure and low adsorption efficiency is formed, separating solid reaction products from the aqueous medium, and subjecting said solid reaction products to the action of an acid solution.

4. In a process of producing insoluble silicates in finely divided form, the steps of disseminating a sparingly soluble compound of alkaline earth metal which is more soluble than the silicate of such metal in an aqueous medium, and slowly adding a soluble silicate to such medium to form a silicate of such metal, the rate of addition of the soluble silicate being such as to maintain its concentration below that concentration at which an insoluble silicate having a dense granular structure and low adsorption efficiency is formed.

5. In a process of producing insoluble silicates in finely divided form, the steps of forming a suspension of a sparingly soluble metallic compound capable of forming an insoluble silicate by interaction with a soluble silicate in an aqueous medium, slowly adding a soluble silicate to such suspension, agitating the suspension during such addition, separating solid reaction products from the aqueous medium, and washing said solid reaction products.

6. In a process of producing insoluble silicates in finely divided form, the steps of forming a suspension of a sparingly soluble metallic compound capable of forming an insoluble silicate by interaction with a soluble silicate in an aqueous medium, slowly adding a soluble silicate in concentrated aqueous solution to such suspension, agitating the suspension during such addition, separating solid reaction products from the aqueous medium, and subjecting said solid reaction products to the action of an acid solution to substantially neutralize the same.

7. In a process of producing insoluble silicates in finely divided form, the steps of forming a suspension of a sparingly soluble metallic compound capable of forming an insoluble silicate by interaction with a soluble silicate in an aqueous medium, slowly adding a soluble silicate to such suspension, agitating the suspension during such addition, separating solid reaction products from the aqueous medium, and drying said reaction products.

8. In a process of producing insoluble silicates in finely divided form, the steps of forming a suspension of a sparingly soluble metallic compound capable of forming an insoluble silicate by interaction with a soluble silicate in an aqueous medium, slowly adding a soluble silicate to such suspension, agitating the suspension during such addition, separating solid reaction products from the aqueous medium, washing said solid reaction products, and removing free moisture from the products.

9. In a process of producing substantially insoluble hydrous silicates having adsorptive properties in finely divided form, the steps of forming a suspension of a sparingly soluble metallic compound capable of forming an insoluble silicate by interaction with a soluble silicate in an aqueous medium, slowly adding a soluble silicate to such suspension, heating such suspension, agitating the suspension during such addition, and separating the solid reaction products from the aqueous medium.

10. In a process of producing hydrous silicates having adsorptive properties in finely divided form, the steps of forming a suspension of a sparingly soluble metallic compound capable of forming an insoluble silicate by interaction with a soluble silicate and a finely divided porous silicious material in an aqueous medium, slowly adding a soluble silicate in aqueous solution to such suspension, agitating the suspension during such addition, and separating solid reaction products from the aqueous medium.

11. In a process of producing hydrous silicates having adsorptive properties in finely divided form, the steps of forming a suspension of a sparingly soluble metallic compound capable of forming an insoluble silicate by interaction with a soluble silicate in an alkaline aqueous medium, slowly adding a soluble silicate in aqueous solution to said suspension, heating and agitating the suspension during such addition, and separating solid reaction products from the aqueous medium.

12. In a process of producing hydrous silicates having adsorptive properties, the steps of forming a suspension of a sparingly soluble metallic compound capable of forming an insoluble silicate by interaction with a soluble silicate in an aqueous medium, slowly adding a soluble silicate in aqueous solution through a period of not less than one hour to said suspension, agitating the suspension during such addition, and separating solid reaction products from the aqueous medium.

13. In a process of producing hydrous silicates having adsorptive properties, the steps of forming a suspension of a sparingly soluble metallic compound capable of forming an insoluble silicate by interaction with a soluble silicate in an aqueous medium, slowly adding a soluble silicate in successive increments through a period of not less than one hour to said suspension, agitating the suspension during such addition, separating solid reaction products from the aqueous medium, and washing said solid reaction products.

14. In a process of producing hydrous silicates having adsorptive properties, the steps of forming a suspension of a sparingly soluble metallic compound capable of forming an insoluble silicate by interaction with a soluble silicate in an aqueous medium, slowly adding a soluble silicate in successive increments through a period of not less than one hour to said suspension, agitating the suspension during such addition, separating solid reaction products from the aqueous medium, and neutralizing said reaction products by means of an acid wash.

15. In a process of producing hydrous magnesium silicates having adsorptive properties, the steps of forming a suspension of a sparingly soluble magnesium compound capable of forming an insoluble silicate by interaction with a soluble silicate in an aqueous medium, slowly adding a soluble silicate to said suspension to form an insoluble hydrous magnesium silicate, the rate of addition of the soluble silicate being such as to maintain its concentration below that concentration at which an insoluble silicate having a dense granular structure and low adsorption efficiency is formed, and separating solid reaction products from the aqueous medium.

16. In a process of producing hydrous magnesium silicates having adsorptive properties, the steps of forming a suspension of a sparingly soluble magnesium compound capable of forming an insoluble silicate by interaction with a soluble silicate in an alkaline aqueous medium, slowly adding a soluble silicate to said suspension to form an insoluble hydrous magnesium silicate, the rate of addition of the soluble silicate being such as to maintain its concentration below that concentration at which an insoluble silicate having a dense granular structure and low adsorption efficiency is formed, maintaining an alkali concentration in said suspension sufficient to prevent appreciable hydrolysis of the soluble silicate, and separating solid reaction products from the aqueous medium.

17. In a process of producing hydrous magnesium silicates having adsorptive properties, the steps of forming a suspension of a sparingly soluble magnesium compound capable of forming an insoluble silicate by interaction with a soluble silicate in an aqueous medium, slowly adding a soluble silicate in successive increments through a period of not less than one hour to said suspension, and separating solid reaction products from the aqueous medium.

18. In a process of producing hydrous magnesium silicates having adsorptive properties, the steps of forming a suspension of a sparingly soluble magnesium compound capable of forming an insoluble silicate by interaction with a soluble silicate in an aqueous medium, slowly adding a soluble silicate in successive increments to said suspension through a period of not less than one hour, said soluble silicate being added in quantities sufficient to provide a molal ratio in the silicate product of magnesia to silica of about 0.3–1.0 to 1.

19. In a process of producing hydrous magnesium silicates having adsorptive properties, the steps of forming a suspension of a sparingly soluble magnesium compound capable of forming an insoluble silicate by interaction with a soluble silicate in an aqueous medium, slowly adding a soluble silicate in successive increments through a period of not less than one hour to said suspension, heating and agitating the suspension during such addition, separating solid reaction products from the aqueous medium, and washing said solid reaction products.

20. In a process of producing hydrous magnesium silicates having adsorptive properties, the steps of forming a suspension of a sparingly soluble magnesium compound capable of forming an insoluble silicate by interaction with a soluble silicate in an aqueous medium, slowly adding a soluble silicate in successive increments through a period of not less than one hour to said suspension, heating and agitating the suspension during such addition, separating solid reaction products from the aqueous medium, and neutralizing said solid reaction products with an acid wash.

21. In a process of producing hydrous magnesium silicates having adsorptive properties, the steps of forming a suspension of a sparingly soluble magnesium compound capable of forming an insoluble silicate by interaction with a soluble silicate in an aqueous medium, slowly adding a soluble silicate in concentrated aqueous solution through a period of not less than one hour to said suspension, heating and agitating the suspension during such addition, separating solid reaction products from the aqueous medium, and removing free moisture from the products.

22. In a process of producing insoluble silicates in finely divided form, the steps of disseminating a precipitated sparingly soluble compound of alkaline earth metal characterized by its low bulk density and which is more soluble than the silicate of such metal, in an aqueous medium, and slowly adding a soluble silicate to such medium to form a silicate of such metal, the rate of addition of the soluble silicate being such as to maintain its concentration below that concentration at which an insoluble silicate having a dense granular structure and low adsorption efficiency is formed.

23. In a process of producing hydrous magnesium silicates having adsorptive properties, the steps of forming a suspension of a precipitated sparingly soluble magnesium compound capable of forming an insoluble silicate by interaction with a soluble silicate and characterized by its low bulk density, in an aqueous medium, slowly adding a soluble silicate to said suspension to form an insoluble hydrous magnesium silicate, the rate of addition of the soluble silicate being such as to maintain its concentration below that concentration at which an insoluble silicate having a dense granular structure and low adsorption efficiency is formed, and separating solid reaction products from the aqueous medium.

ERNEST WAYNE REMBERT.